United States Patent [19]

Dalton

[11] Patent Number: 5,555,102
[45] Date of Patent: Sep. 10, 1996

[54] SYSTEM AND METHOD FOR GENERATING IMAGES WITH IMPROVED VISUAL QUALITY USING LOCAL CORRELATION, ORDERED DITHER

[75] Inventor: John C. Dalton, San Francisco, Calif.

[73] Assignee: Apple Computer, Inc., Cupertino, Calif.

[21] Appl. No.: 379,919

[22] Filed: Jan. 30, 1995

[51] Int. Cl.$^6$ .............................. H04N 1/40; H04N 1/405
[52] U.S. Cl. ........................ 358/456; 358/457; 358/460; 358/466
[58] Field of Search ..................................... 358/457, 466, 358/456, 455, 460, 465, 535, 534, 298; 382/270, 275

[56] References Cited

U.S. PATENT DOCUMENTS

| | | |
|---|---|---|
| 4,920,501 | 4/1990 | Sullivan et al. . |
| 5,111,310 | 5/1992 | Parker et al. . |
| 5,150,428 | 9/1992 | Leone et al. ............................ 358/466 |
| 5,214,517 | 5/1993 | Sullivan et al. ....................... 358/456 |
| 5,317,418 | 5/1994 | Lin . |

FOREIGN PATENT DOCUMENTS 0593304  4/1994  European Pat. Off. .

OTHER PUBLICATIONS

Ray, Sullivan and Thomas, Simulated Annealing Applied To Correlated Digital Halftone Patterns, pp. 142–146.
Mitsa, T. and Parker, K., Digital Halftoning Technique Using a Blue–Noise Mask, J. Opt. Soc. Am. A, vol. 9, No. 11, Nov. 1992.
Ulichney, R., The Void–and–Cluster Method for Dither Array Generation, SPIE vol. 19123, Feb. 1993, pp. 33–343.

*Primary Examiner*—Scott A. Rogers
*Attorney, Agent, or Firm*—Greg T. Sueoka; Michael F. Heafey

[57] ABSTRACT

A system for producing a set of dither matrix signals having local correlation comprises a processor, an input device, a display device, a hard output device, an incremental threshold generator, a pattern generator, an optimizer, a dither matrix storage, and a pixel activator. The incremental threshold generator determines a maximum tolerable error and generates an incremental threshold signal. The maximum tolerable error is the greatest tolerable variation between dither matrices for adjacent gray levels. The incremental threshold signal controls the transition of cells of dither matrices for adjacent gray levels. The pattern generator receives the incremental threshold signal and a dither matrix signal for the previous gray level and generates the possible pattern signals based on a dither matrix signal for an adjacent gray level and the incremental threshold signal. The optimizer receives the possible pattern signals, selects the pattern signal that introduces the least error into the output image, and stores the pattern signal in the dither matrix storage as the dither matrix signal for the gray level. The pixel activator uses the set of dither matrix signals to generate an output image. A method for generating a set of dither matrix signals having local correlation includes the steps of receiving a local correlation signal, determining a maximum tolerable error, generating an incremental threshold signal, and modifying a first dither matrix signal according to the incremental threshold signal to produce a second dither matrix signal.

24 Claims, 8 Drawing Sheets

SYSTEM AND METHOD FOR GENERATING IMAGES WITH IMPROVED VISUAL QUALITY USING LOCAL CORRELATION, ORDERED DITHER

BACKGROUND OF THE INVENTION

1. Field of the Invention

The present invention relates generally to systems for half-toning the outputs of printers and other output devices. In particular, the present invention relates to a system and method for generating images with improved visual quality using local correlation, ordered dither.

2. Description of the Background Art

When an output device has a limited range of intensities, that range can be made to appear to be broader by half-toning the output on the output device. Half-toning is particularly useful when an output device has only two possible outputs for a pixel, white or opaque. A pixel is the smallest unit that the output device can resolve when rendered on a display device or paper. Examples of such limited range output devices are laser printers, ink jet printers, and liquid crystal displays. The output of such devices can be made to appear to have a gray scale, a range of grays between white and opaque, by half-toning. The theory underlying half-toning is that human visual perception tends to average closely adjacent pixels. Thus, by varying the density of white and opaque pixels, an image, that is made up entirely of white and opaque pixels, can be made to appear to have various levels of gray. Generally, the more opaque pixels in a region of an image, the darker gray is the appearance of the region.

There are two distinct and basic methods of half-toning. One method is error diffusion. In error diffusion, an error is calculated for each element of the input image. An element is a region of the input image that corresponds to a pixel of the output image. The error is the difference between the intensity of the element and the closest possible gray level. Once the errors have been calculated, a first element is selected. The error for the first pixel is used to adjust the intensity levels of adjacent elements. The adjacent elements are then selected and their errors are used to adjust the intensity levels of their adjacent elements. This process is repeated, and the error diffusion proceeds across the image. Once the errors are diffused, each pixel is assigned the gray level that is closest to the intensity level of its corresponding element.

Although it has a tendency to produce low frequency, texture artifacts, often called "worms," in the output image, error diffusion generally produces high quality output images. Error diffusion introduces noise to the output image. The frequency spectrum of the noise introduced by error diffusion appears as a cloud with no frequency, or frequencies, dominating. The noise spectrum of error diffusion is highly desirable. Error diffusion, however, is extremely computationally expensive. It is, therefore, slow and not the generally preferred method for dither.

The second, basic method for half-toning is called ordered dither. Ordered dither may be 2-dimensional or 3-dimensional. Two dimensional ordered dither involves a single dither matrix. A dither matrix, either for 2-dimensional or 3-dimensional dither, is typically 64 by 64 cells. The dither matrix is replicated, or tiled, across the image so that each element, and corresponding pixel, has a corresponding cell in a dither matrix.

Figure 1:
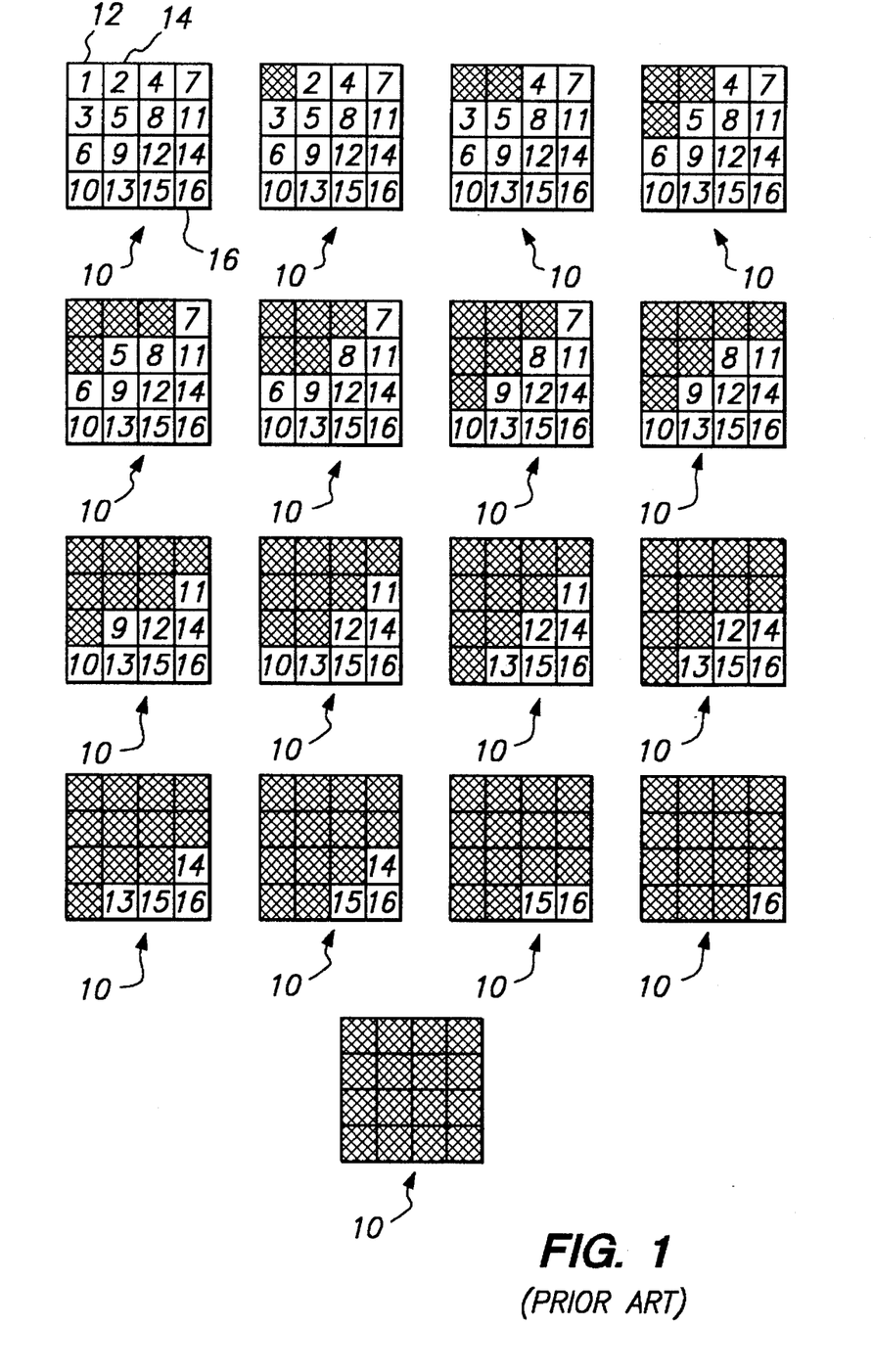
FIG. 1 is a block diagram of a plurality of views of a dither matrix for fully stacked dither.

Referring now to FIG. 1, a block diagram of 17 views of an exemplary dither matrix 10 providing 17 gray levels is shown. The exemplary dither matrix 10 comprises 16 cells. Each cell has an assigned threshold. Thus, a first cell 12 has threshold 1, a second cell 14 has threshold 2, and the remaining cells have thresholds such that a sixteenth cell 16 has threshold 16. A full sized dither matrix is generally much larger, such as 64 cells by 64 cells, and has thresholds between 1 and 4096, inclusive. A 16 cell by 16 cell matrix is being used here, however, for explanation purposes and ease of understanding. The thresholds would be appropriately scaled for the input signal. When an image is being half-toned, the intensity of each element of the input image is compared to the threshold of its corresponding cell. If the intensity of the element is greater than or equal to the threshold of the cell, then the corresponding pixel is turned on. When a pixel is turned "on" or "activated," it is made opaque. This method of ordered dither is often called fully stacked dither. In fully stacked dither pixel remains off until its threshold, held in the corresponding cell of a dither, a matrix, is reached by the intensity of the corresponding element in the input signal. Once a pixel is on, it is on for all higher intensities. This can be seen in FIG. 1. FIG. 1 shows the dither matrix 10 for all 17 gray levels that it can be used to produce. Note that the cells of the dither matrix 10 are not activated. FIG. 1 shows the pixels that would be activated, or turned on, for each gray level. Thus, the first view shows the cells activated by the lowest gray level; the second view shows the cells activated by the second lowest gray level, and the last view shows the cells activated by the highest gray level. A first gray level is all white, and no cells are turned on. The next gray level has the first cell 12 turned on. Therefore, if the element that corresponds to the first cell 12 has the first gray level, the corresponding pixel is turned on. If the elements that correspond to the other cells have the first gray level, then their corresponding pixels are not turned on. For each subsequent gray level, a cell has a matching threshold. Thus, for the third gray level, the second cell 14 has a threshold that would cause the corresponding pixel to be activated, and for the last gray level, all opaque, the sixteenth cell 16 and all other cells are activated.

FIG. 1 shows the dither matrix 10 for each of the 17 gray levels. Since the same dither matrix is used for all 17 gray levels, the dither matrix 10, full stacked dither is referred to as 2-dimensional dither.

This form of ordered dither is computationally inexpensive and is, therefor, generally preferred to error diffusion. It has, however, several deficiencies. A first deficiency is that the frequency spectrum of the noise introduced by fully stacked dither is not a cloud with no frequency, or frequencies, dominating. The frequency spectrum of the noise introduced by fully stacked dither has a few discrete frequencies dominating. It is unlike the cloud of noise introduced by error diffusion. A second deficiency is that one pattern of thresholds is optimal. A pattern is the layout of the thresholds within the dither matrix. The optimal pattern is generated for one gray level for the dither matrix. The optimal pattern is the pattern for a gray level that introduces the least distortion to the output. Additional thresholds are then added and subtracted for higher and lower gray levels, respectively. Only the initial pattern, however, is optimal. Additionally, as the gray level moves further away from the gray level having the initial, optimal pattern, the patterns may become less optimal.

Figure 2:
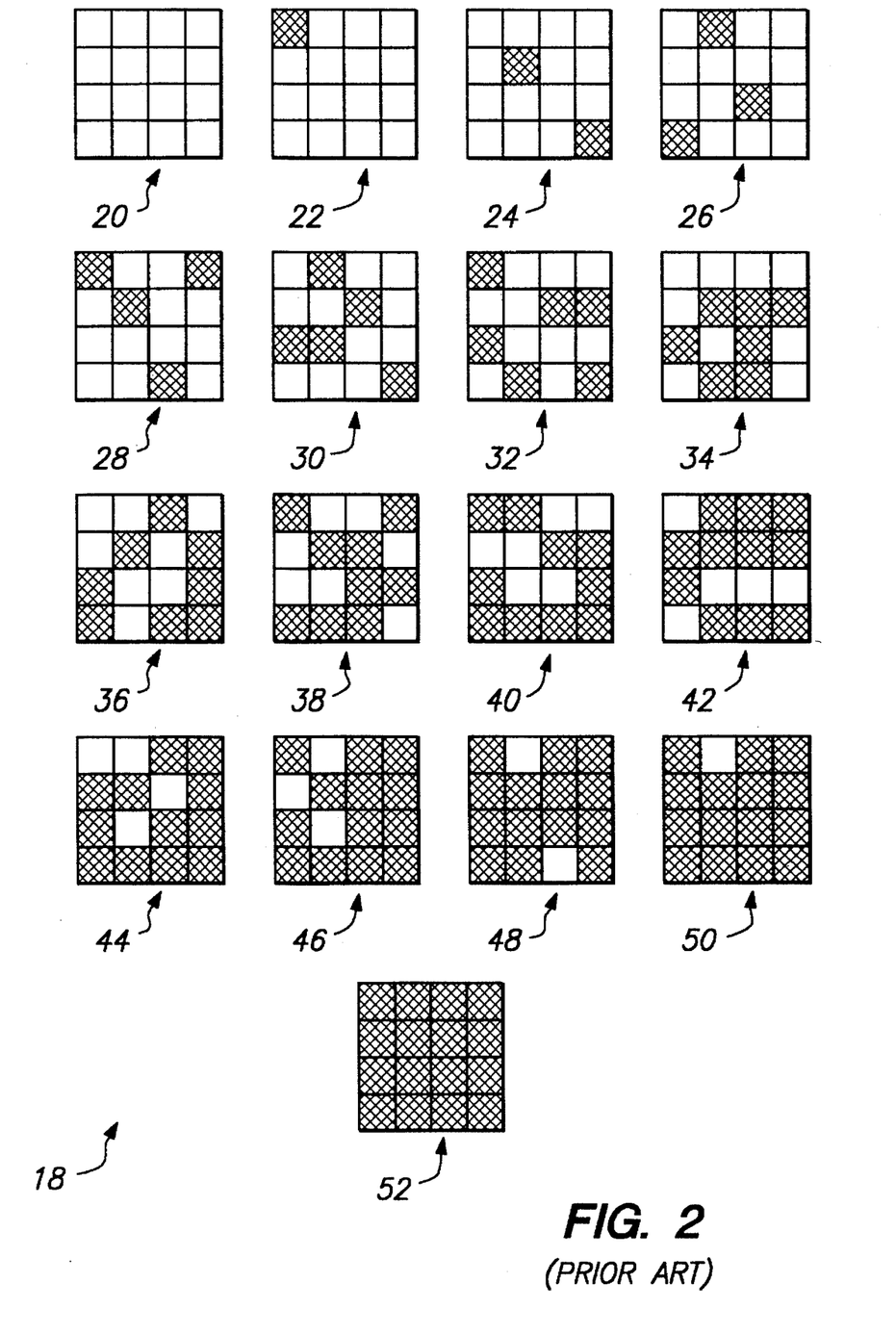
FIG. 2 is a block diagram of a set of dither matrices used for 3DGLOOD.

These deficiencies in ordered dither have lead to attempts to develop dither techniques that produce noise frequency spectra that are more similar to the cloud of noise introduced by error diffusion. One of these techniques is 3-dimensional, gray level optimized ordered dither ("3DGLOOD"). 3DGLOOD attempts to overcome the problems of fully stacked dither and is often referred to as 3-dimensional dither. In 3DGLOOD, each gray level has a dither matrix, and a unique pattern of thresholds is generated for every gray level. The pattern of the thresholds of the dither matrix for a given gray level is optimized for that gray level. In 3-dimensional dither, the term pattern and the term dither matrix are often used interchangeably. Referring now to FIG. 2, a block diagram of an exemplary set 18 of dither matrices is shown. The set 18 of dither matrices having 17 dither matrices 20–52. Each dither matrix 20–52 is assigned to a gray level of a gray scale comprising 17 levels. Each dither matrix 20–52 comprises 16 cells arranged in a 4×4 square. The dither matrices 20–52 are assigned in order of the gray levels. Thus, the first dither matrix 20 is assigned to the first gray level, all off, and the last dither matrix 52 is assigned to the last gray level, all on. The intervening dither matrices 22–50 are assigned to the intervening gray levels. Each succeeding dither matrix 20–52 has one additional cell turned on. For example, the third dither matrix 24 has 2 cells turned on, and the fourth dither matrix 26 has 3 cells turned on. There are other ways the cells may be turned on; each succeeding gray level may have 2 cells turned on. This would require a 4×4 dither matrix to generate 9 gray levels.

For a selected element of an image, a dither matrix 20–52, which corresponds to the closest gray level to the intensity of the element, is selected. If the cell of the selected dither matrix, which corresponds with the element, is on, then the corresponding pixel is turned on, otherwise the pixel is turned off. This is not a threshold test. The cell indicates either to activate the corresponding pixel or not to activate the corresponding pixel.

For each dither matrix 20–52, the pattern of cells that are turned on is optimized for its assigned gray level. There is no relationship between the patterns of the dither matrices 20–52. Thus, 3DGLOOD eliminates the non-optimal pattern problem of fully stacked dither. 3DGLOOD, however, has an even greater problem. Each pattern of the dither matrices 20–52 is different. Human visual perception does not transition well between different patterns. Thus, when two adjacent gray levels are displayed next to each other, a viewer will perceive patterns in the output image. These patterns are due to changes in the frequency spectrum of neighboring gray level patterns. That is, 3DGLOOD does not produce a cloud of noise, but produces structure within the noise spectrum from the discontinuous matrices. These patterns are called visual artifacts and are introduced into the output image by 3DGLOOD. For this reason, 3DGLOOD is less preferred than fully stacked dither.

There is a need for a system and method for half-toning an image that is computationally inexpensive, that produces patterns that are close to optimal patterns, and that does not introduce visual artifacts into the output image.

SUMMARY OF THE PRESENT INVENTION

The present invention overcomes the deficiencies and limitations of the prior art with a system and method for ordered dither with local correlation. The present invention uses a set of dither matrices for 3-dimensional dither where there is local correlation between dither matrices for adjacent gray levels. Local correlation means that the patterns of cells that are turned on and turned off changes between dither matrices of adjacent gray levels. Local correlation, however, constrains the variation. Thus, each dither matrix of the set of dither matrices is closer to optimal than in the case of fully stacked dither, but the dither matrices are not allowed to vary to the point where visual artifacts are introduced. The optimal pattern, is the pattern that introduces the least error for that gray level. Furthermore, no distortion is introduced as a result of discontinuous matrices. The frequency spectrum of the noise produced by the present invention is more like the noise frequency spectrum produced by error diffusion and thus enhances the visual quality of the image.

The present invention includes a system both for generating a set of dither matrices having local correlation and for generating an output image using the set of dither matrices having local correlation. The system comprises a processor, an input device, an output device, an incremental threshold generator, a pattern generator, an optimizer, a dither matrix storage, and a pixel activator. The incremental threshold generator is coupled to the input device to receive a local correlation criteria signal from a user. The local correlation criteria signal indicates the percent of similarity between dither matrices for adjacent gray levels. The incremental threshold generator uses the local correlation criteria signal to determine a maximum tolerable error. The maximum tolerable error is the number and nature of transitions of cell states between dither matrices for adjacent gray levels. From the maximum tolerable error, the incremental threshold generator generates a incremental threshold signal that controls the transition of cell states to form a dither matrix.

The pattern generator is coupled to receive the incremental threshold signal from the incremental threshold generator. The pattern generator generates possible patterns for a gray level from the pattern for the immediately preceding gray level and the incremental threshold signal. The pattern generator then generates a possible patterns signal that indicates all the possible patterns that may be generated according to the first pattern and the incremental threshold signal. The optimizer receives the possible patterns signal and selects the pattern that is closest to optimal. The optimizer uses spatial techniques, frequency techniques, or both to determine the possible pattern that will introduce the least amount of error into the output image. The optimizer generates a signal to store signals indicative of the selected pattern in the dither matrix storage as the dither matrix for the selected gray level. The pixel activator compares the dither matrices stored in the dither matrix storage to an input image to generate an output image on an output device.

The present invention also includes a method for generating a set of dither matrices with local correlation. The method includes the steps of receiving a local correlation criteria signal and generating a maximum tolerable error. In addition to the local correlation criteria signal, the maximum tolerable error is based on the size of the dither matrices, the number of gray levels, and the characteristics of the output device. The method then generates an incremental threshold signal for a gray level. From the incremental threshold signal and the dither matrix for the preceding gray level, the possible dither matrices for the selected gray level are generated. The possible dither matrices are then compared to an ideal dither matrix and the possible dither matrix with the least error is selected as the dither matrix for the selected gray level. The method is repeated for each gray level that the output device can generate.

DETAILED DESCRIPTION OF THE PREFERRED EMBODIMENT

Figure 3:
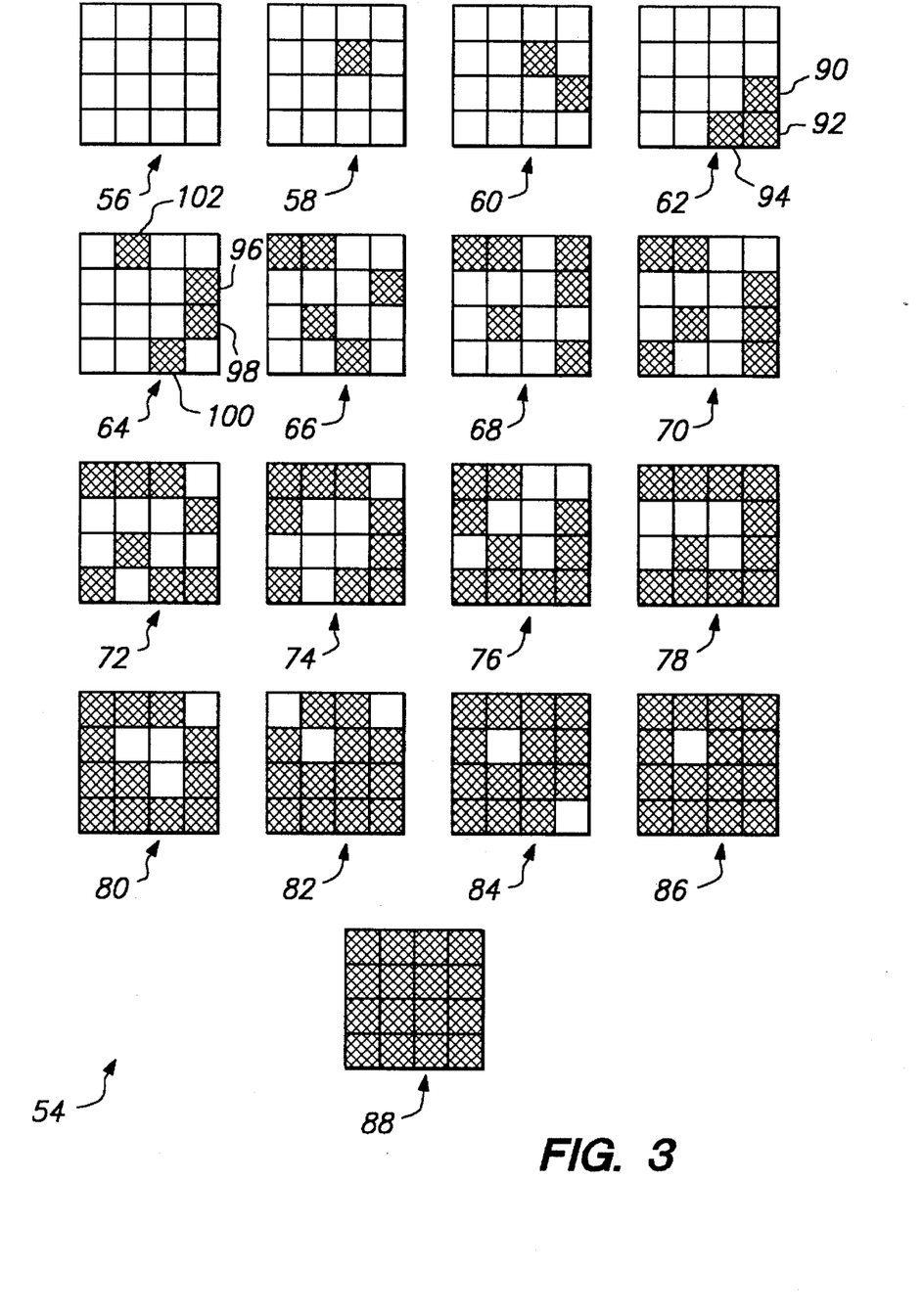
FIG. 3 is a block diagram of an exemplary set of dither matrices having local correlation.

Referring now to FIG. 3, a block diagram of an exemplary set 54 of dither matrices is shown. The set 54 comprises 17 4×4 dither matrices. Each dither matrix comprises 16 cells. The set 54 is for use with an output device having 17 gray levels. There is a dither matrix for each gray level. A first dither matrix 56 is for the first gray level, all off. A second dither matrix 58 is for the second gray level, one cell on. Each of the remaining 15 dither matrices 60–88 is assigned to the remaining gray levels respectively. The dither matrices 56–88 of this exemplary set 54 have local correlation. Local correlation means that the patterns of active cells in the dither matrices 56–88 are related and are not random. The pattern of activated cells for a gray level is related or correlated to the pattern of activated cells for the immediately preceding gray levels. The patterns of the dither matrices 56–88 follow an exemplary rule of two on and one off. In particular, each dither matrix 56–88 has the pattern of the preceding dither matrix 56–88 with two additional cells turned on and one cell, which was on in the preceding pattern or was one of the two cells turned on, turned off. This can be seen with reference to dither matrix 62 and dither matrix 64. Dither matrix 62 has a first cell 90, a second cell 92, and a third cell 94 turned on. All other cells of the dither matrix 62 are turned off. Dither matrix 64 has a first cell 96, a second cell 98, a third cell 100 and a fourth cell 102 turned on. All other cells of the dither matrix 64 are turned off. A comparison of the pattern of dither matrix 62 and the pattern of dither matrix 64 shows that two cells of dither matrix 62, which were turned off, have been turned on in dither matrix 64, and one cell, which was turned on in dither matrix 62, has been turned off in dither matrix 64. The other dither matrices 56–88 are related to each other in the same way; this relationship is an example of local correlation.

The present invention advantageously uses local correlation to generate an improved output image. Each of the dither matrices 56–88 may be as close to an optimal pattern for its assigned gray level as is possible within the confines of the local correlation. Thus, the present invention overcomes the problems of fully stacked dither. Each of the patterns of the dither matrices 56–88 will be closer to optimal for its gray level than will the non-optimized patterns of fully stacked dither. The local correlation between the patterns of adjacent gray levels also overcomes the problems associated with 3DGLOOD. The local correlation reduces the difference between the patterns of the dither matrices 56–88. The reduction in this difference reduces the introduction of visual artifacts. The frequency spectrum of the noise introduced by the present invention is advantageously similar to the noise frequency spectrum introduced by error diffusion. Thus, the present invention overcomes the deficiencies and limitations of both fully stacked dither and 3DGLOOD.

For ease of explanation, FIG. 3 shows the cells as squares and not overlapping. The cells may be any geometric shape and may overlap. The systems and methods of the present invention work with cells of any shape and size and with overlapping cells.

Figure 4:
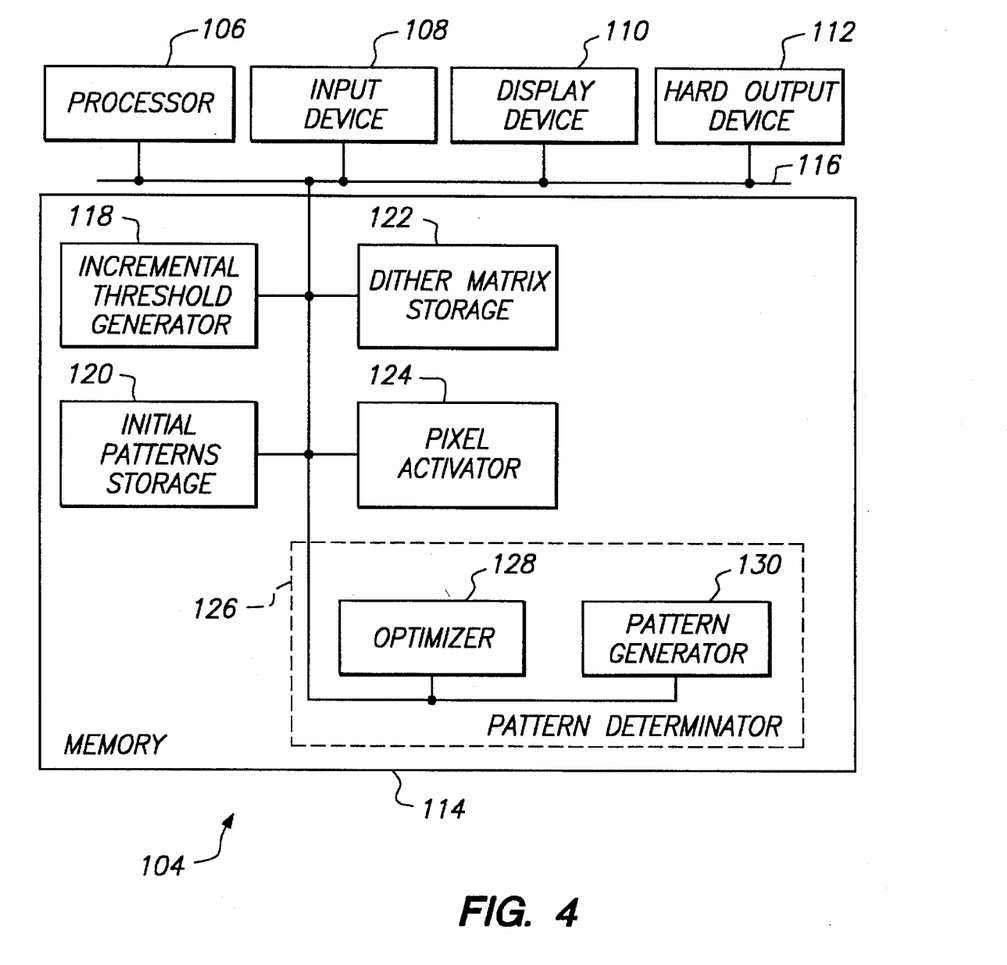
FIG. 4 is a block diagram of a system for generating a set of dither matrices having local correlation and for generating an output image using a set of dither matrices having local correlation.

Referring now to FIG. 4, a block diagram of a system 104 for generating a set of dither matrices having local correlation and for generating an image using a set of dither matrices having local correlation, is shown. The system 104 preferably comprises a processor 106, an input device 108, a display device 110, a hard output device 112, and a memory 114. The processor 106, input device 108, display device 110, hard output device 112, and memory 114 are coupled in avon Neuman architecture by a bus 116. The preferred embodiment of the system 104 is a Macintosh Quadra 840AV computer system from Apple Computer, Inc. of Cupertino, Calif. Those skilled in the art will realize that the system 104 maybe implemented in any computer system.

The processor 106 is preferably a microprocessor such as a Motorola 68040. The input device 108 comprises a keyboard and mouse type controller. The display device 110 is preferably a monitor such as an Apple Performa Plus Display from Apple Computer, Inc. The display device 110 has a limited range of outputs, which may be expanded by half-toning. The hard output device 112 is preferably a Color Style Writer from Apple Computer, Inc. The hard output device 112 may alternately be any laser printer, ink jet printer, or other type of printer having a limited range of outputs.

The memory 114 comprises random access memory (RAM) and read only memory (ROM) for storing data and program instruction steps. The memory 114 comprises an incremental threshold generator 118, an initial patterns storage 120, a dither matrix storage 122, a pixel activator 124, and a pattern determinator 126. While the component parts of the memory 114 will now be discussed as separate devices, those skilled in the art will realize that the component parts may occupy contiguous sections of a single memory space and may be routines that when loaded and executed by the processor 106 control the processor 106 to act as such separate devices.

The incremental threshold generator 118 is a set of program instruction steps that when executed by the processor 116 determines a maximum tolerable error and generates an incremental threshold signal. The incremental threshold generator 118 is coupled to the input device 108 and receives a local correlation criteria signal from the input device 108. The local correlation criteria signal specifies the required similarity between dither matrices for adjacent gray levels. From the local correlation criteria signal, the incremental threshold generator 118 determines a maximum tolerable error. The maximum tolerable error is a range in which the patterns are allowed to vary between dither matrices for adjacent gray levels. In addition to the local correlation criteria signal, the maximum tolerable error is based upon the number of gray levels, the characteristics of the display device 110 or hard output device 112, and the size of the dither matrices. The incremental threshold generator 118 receives signals indicative of the number of gray levels, the characteristics of the display device 110 or hard output device 112, and the size of the dither matrices from the input device 108. The incremental threshold generator 118 stores these signals and uses these signals to determine the maximum tolerable error. The incremental threshold generator 118 includes a counter to record the gray level for which the system 104 is currently generating a dither matrix signal.

The incremental threshold signal is based on the maximum tolerable error and indicates the number and nature of cell transformations that take place between the pattern of a dither matrix for a gray level and the pattern of a dither matrix for the next gray level. In the preferred embodiment, the incremental threshold signal has two components. The first component indicates the number of cells to activate, and the second component indicates the number of cells to de-activate. For example, the incremental threshold signal may state that two cells are to be turned on and one cell is to be turned off between a first pattern for a first gray level and a second pattern for the next gray level. The incremental threshold signal may alternately indicate that three cells are to be turned on and two cells are to be turned off. Those skilled in the art will realize that the incremental threshold signal may indicate that any number of cells are to be turned on and are to be turned off. The incremental threshold signal must, however, signal a difference between the number of cells turned on and the number of cells turned off so as to move the pattern from the first gray level to the next gray level. For example, a set of 4×4 cell dither matrices can support 17 gray levels. When supporting 17 gray levels, there is a difference of one cell between patterns for adjacent gray levels. Thus, the incremental threshold signal must always signal that the number of cells turned on is to be one more than the number of cells to be turned off. If a set of 4×4 dither matrices were being used for nine gray levels, then the difference between the number of cells being turned on and the number of cells being turned off must be 2. This is due to the fact that, in this case, 2 cells must be turned on in order to move from a first gray level to the next higher gray level. The incremental threshold signal can vary between gray levels. For example, between a first and second gray level the incremental threshold signal is 2 on and 1 off. Between the second gray level and a third gray level, the incremental threshold signal is 3 on and 2 off. The incremental threshold generator 118 is coupled to the pattern determinator 126.

The initial patterns storage 120 is a memory device that stores signals indicative of the boundary patterns and any intermediate patterns that a user may designate. The initial pattern signals are all pattern signals stored in the initial pattern signals storage 120. The initial pattern signals include the boundary pattern signals and intermediate pattern signals. The boundary pattern signals are a pattern signal for the first gray level and a pattern signal for the last gray level. Generally, the full range of the display device 110 or hard output device 112 is used. In this case there are two initial pattern signals, a first initial pattern signal with all off and a second initial pattern signal with all cells on. These initial pattern signals are the boundary pattern signals and correspond to dither matrix 56 and dither matrix 88, respectively, of FIG. 3. These two patterns are the initial patterns by default. The display device 110 or hard output device 112 need not, however, be used over its full range. Thus, the boundary gray levels need not be all off and all on. If other pattern signals are being used for the boundaries, these pattern signals are held in the initial patterns storage 120. Furthermore, a user may specify particular patterns for certain gray levels between the patterns boundary levels. The user may desire that the pattern for a particular gray level be optimized. A signal indicating this optimal pattern is held in the initial pattern storage 120. The user may for any other reason desire the pattern for certain gray levels be pre-determined. The initial patterns storage 120 receives signals indicative of the initial patterns from the input device 108. The initial patterns storage 120 may hold any number of initial pattern signals but preferably stores at least 2 initial pattern signals, the boundary pattern signals. The initial patterns storage 120 also holds an indicator with each initial pattern signal. An indicator identifies the gray level of the initial pattern signal. The initial patterns storage 120 is coupled to the input device 108, incremental threshold generator 118 and to the dither matrix storage 122.

The dither matrix storage 122 is a memory device that stores signals that indicate the sets of dither matrices generated by the pattern determinator 126. The dither matrix storage 122 stores separate sets of signals for the display device 110 and hard output device 112. A set of dither matrix signals is preferably held in the dither matrix storage 122 as a plurality arrays. There is a corresponding array in the dither matrix storage 122 for each dither matrix. Each array provides a bit for each cell of the matrix. If a bit holds a 1, then the cell is on. If a bit holds a 0, then the cell is off.

The pixel activator 124 is a memory device that stores set of program instruction steps. When executed by the processor 106, the pixel activator 124 receives an image to be output on the display device 110 or the hard output device 112; retrieves the dither matrix signals for the display device 110 or hard output device 112 on which the image is to be output; compares the received image to the received dither matrix signals; determines, from the comparison, if each pixel of the output image should be turned on; and outputs a signal to the display device 110 or hard output device 112 to turn on the appropriate pixels to generate the output image. The pixel activator 124 is coupled to receive a continuous toned image signal and is coupled to the dither matrix storage 122 to retrieve the appropriate dither matrix signals. The pixel activator 124 is also coupled to the display device 110 and to the hard output device 112.

In an alternate embodiment, the display device 110 and hard output device 112 each has its own pixel activator and local storage for dither matrix signals. In this alternate embodiment, when the display device 110 is to output an image, the pixel activator of the display device 110 would receive the image, the pixel activator of the display device 110 would also receive the dither matrix signals from its local storage, and the pixel activator would generate a signal to activate the appropriate pixels of the display device 110. Similarly, the hard output device 112 would have its own pixel activator and local storage.

The pattern determinator 126 is a memory device that stores a set of program instruction steps that, when executed by the processor 106, generates dither matrix signals having local correlation. The pattern determinator 126 has a first input coupled to receive the incremental threshold signal from the incremental threshold generator 118 and a second input coupled to receive the pattern signal of the dither matrix signal for the immediately lower gray level from the dither matrix storage 122. The pattern determinator 126 generates a dither matrix signal that has local correlation to the dither matrices for the preceding gray levels. The pattern determinator 126 outputs the generated dither matrix signal to the dither matrix storage 122 for storage.

The pattern determinator 126 comprises an optimizer 128 and a pattern generator 130. When generating a dither matrix signal for a gray level, the pattern generator 130 receives the incremental threshold Signal from the incremental threshold generator 118 and the dither matrix for the immediately preceding gray level. The pattern generator 130 also receives a signal from the incremental threshold generator 118 that signals the state of the counter to indicate the correct gray level. The pattern generator 130 signals the initial pattern storage to determine if there is an initial pattern signal for the current gray level. The pattern generator 130 then signals the dither matrix storage to transmit the pattern signal for the immediately prior gray level to the pattern generator 130. The pattern generator 130 then generates the pattern signals that are possible according to the incremental threshold signal and the received dither matrix signal. For example, if the incremental threshold signal indicates that 2 cells are to be turned on and 1 cell is to be turned off, then pattern generator 130 generates the possible pattern signals that result from turning on 2 cells and turning off 1 cell starting from the received dither matrix signal. The pattern generator 130 generates all possible pattern signals according to the incremental threshold signal and the dither matrix signal for the immediately preceding gray level. The pattern generator 130 then transfers the pattern signals to the optimizer 128. The pattern generator 130 is coupled to the incremental threshold generator 118, the initial patterns storage 120, the dither matrix storage 122, and the optimizer 128.

The optimizer 128 receives the pattern signals from the pattern generator 130 and selects the best pattern signal. Every dither matrix introduces some distortion, or error, into the output image. There are spatial and frequency techniques to determine the amount of error that a dither matrix introduces into the output image. These techniques include low pass, or gaussian, filters, simple visual models such as Hall & Hall or Sakrison, more complicated multi-resolution models such as Daly or Lubin, or a visually weighted error criteria such as Allerach. Those skilled in the art will recognize these techniques. The optimizer 128 uses spatial techniques, frequency techniques, or both to determine the pattern signal, received from the pattern generator 130, that introduces the least error to the output image. The optimizer 128 then generates a signal to store the selected pattern signal in the dither matrix storage 122 as the dither matrix signal for the current gray level. The optimizer 128 is coupled to the dither matrix storage 122.

The interplay of the incremental threshold generator 118 and the optimizer 128 advantageously allows the present invention to generate a set of dither matrix signals that are closer to optimal than fully stacked dither but do not introduce the visual artifacts of 3DGLOOD. The incremental threshold generator 118 introduces variation into the patterns of the dither matrices that does not exist in fully stacked dither. The incremental threshold generator 118, however, limits the variability so that visual artifacts, associated with 3DGLOOD, are not introduced. The optimizer 128 limits the deviation from optimality by enforcing optimality within the bounds established by the incremental threshold generator 128. The result is ordered dither that produces better output images than either fully stacked dither or 3DGLOOD. Ordered dither with local correlation is also computationally inexpensive and is, therefor, preferred to error diffusion.

Figure 5A:
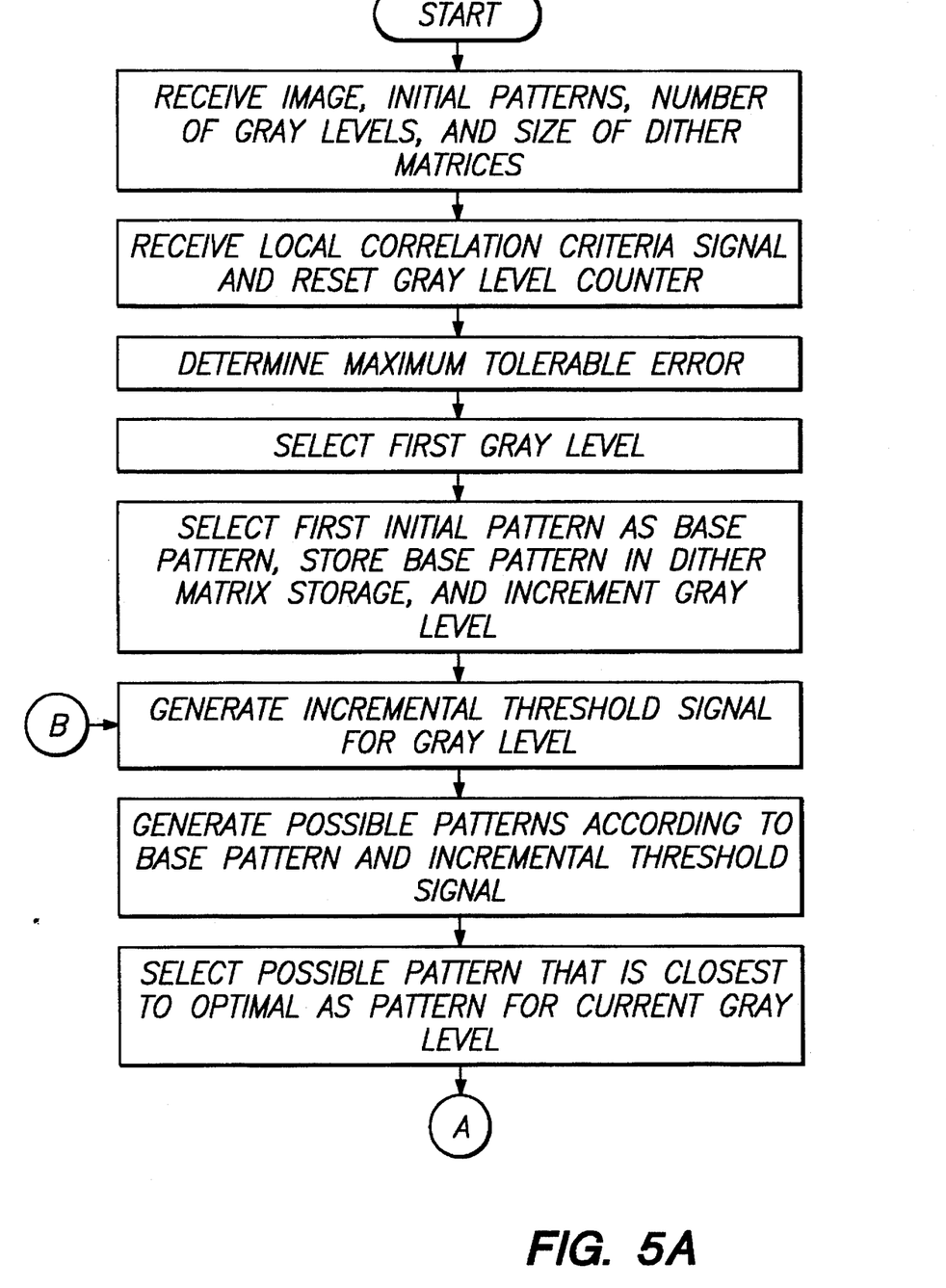
FIGS. 5A and 5B are flow charts showing the preferred method for generating a set of dither matrices having local correlation and for generating an output image using the set of dither matrices having local correlation.
Figure 5B:
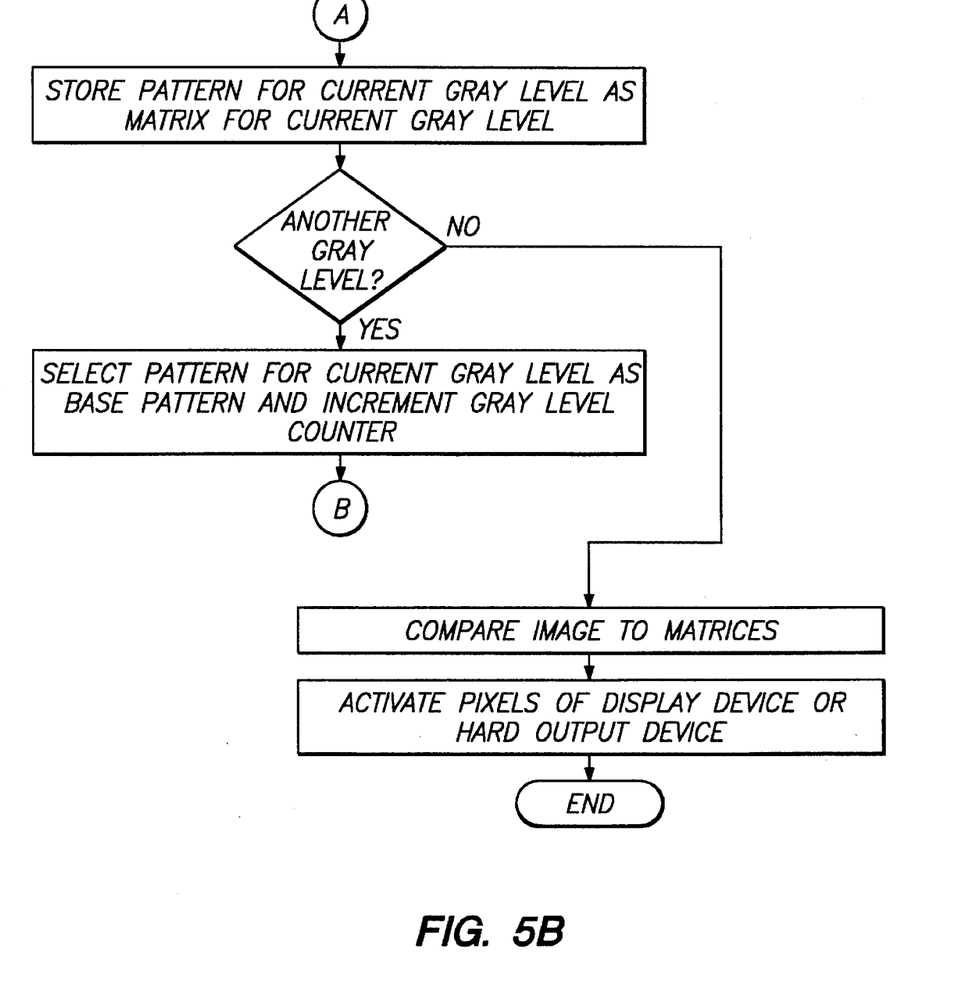

Referring now to FIGS. 5A and 5B, flow charts of a method for generating a set of dither matrix signals having local correlation and for generating a half-toned output using dither matrix signals having local correlation are shown. The method begins in step 500 where the system 104 receives an input image that is to be output on the display device 110 or on the hard output device 112, initial patterns, the number of gray levels, and the size of the dither matrices. The system 104 also receives data signals describing the number of gray levels, and size of the dither matrices through the input device 108. If the system 104 does not receive any initial patterns, then the system 104 will use all cells off and all cells on as initial patterns for the boundaries of the gray levels. In step 502, the system 104 receives a local correlation criteria signal. The local correlation criteria signal is preferably expressed as a percentage between 0% and 100%. The local correlation criteria signal is the percentage of similarity between patterns of dither matrices for adjacent gray levels. For example, if the local correlation criteria signal is 50%, then 50% of the cells of a dither matrix will be in the same state as the cells of the dither matrix for the immediately preceding gray level. Note that a local correlation criteria signal of 100% results in fully stacked dither, and a local correlation criteria signal of 0% results in 3DGLOOD. The present invention advantageously uses a local correlation criteria signal between 0% and 100% to generate a set of dither matrices that are closer to optimal than the fully stacked dither but that do not introduce the visual artifacts of 3DGLOOD. In general, 1 or 2 cells are preferably transition state between dither matrices of adjacent gray levels. This means that for 64 cell by 64 cell dither matrices, a local correlation criteria signal of 99.975% is preferred. Local correlation criteria signal of any percentage may, however, be used.

Next in step 504, the incremental threshold generator 118 determines the maximum tolerable error. The maximum tolerable error is based on the number of cells in the dither matrices and the local correlation criteria signal and is the maximum number of cells that may be turned on and turned off between patterns of dither matrices for adjacent gray levels. If the local correlation criteria signal is 93.75%, the dither matrices are 4 cells by 4 cells, and there are 17 gray levels, then the maximum tolerable error is 2 on and 1 off. The incremental threshold generator 118 determines the minimum number of cells to be turned on by determining the number of cells that must be turned on to move from one gray level to the next gray level. This number is obtained by determining the quotient of the number of cells of a dither matrix and the number of gray levels less 1. In the example here, the quotient is 1. The incremental threshold generator 118 then determines the number of cells that may change state, either from on to off or from off to on, by determining product of the difference between 100% and the local correlation criteria signal and the number of cells of a dither matrix. The incremental threshold generator 118 adds the number of cells that may be swapped to the minimum number that must be turned on, to move from one gray level to the next, to determine that number of cells to turn on between gray levels. The number of cells that may be turned of and turned off is the number of cells to be turned off. Thus, this example results in a maximum tolerable error of 2 cells on and 1 cell off. By way of another example, if the dither matrices are again 4 cells by 4 cells and there are 17 gray levels, but the local correlation criteria signal is now 90.625%, then the maximum tolerable error is 2.5 cells on and 1.5 cells off. Also in step 504, the incremental threshold generator 118 resets its gray level counter.

In step 506, the first gray level is selected. The first gray level may be either all off or may be the gray level for the first initial pattern received in step 500. In step 508, the method selects the pattern signal for the first gray level as a base pattern. The pattern for the first gray level is either all off, if the first gray level is white, or is an initial pattern received in step 500. The first pattern signal is stored in the dither matrix storage 122 as the dither matrix signal for the first gray level, and the next gray level is then selected. The pattern signal for the first gray level already exists. It is either all off or the first initial pattern signal. Therefore, a pattern need not be generated. The incremental threshold generator 118 generates an incremental threshold signal for the gray level. The incremental threshold generator 118 generates the incremental threshold signal from the maximum tolerable error. The incremental threshold signal is the maximum tolerable error rounded down to the nearest integer. Any remainder that is eliminated in the rounding process is saved and added to the maximum tolerable error for the next gray level. For example, if the maximum tolerable error is 2 on and 1 off, then the incremental threshold signal is always 2 on and 1 off. If, however, the maximum tolerable error is 2.5 on and 1.5 off, then the first incremental threshold signal is 2 on and 1 off. The half cell on and half cell off is saved so that the incremental threshold signal for the next gray level is 3 on and 2 off.

In step 512, the pattern generator 130 receives the base pattern and the incremental threshold signal. The pattern generator 130 then generates the possible pattern signals that are the result of applying the incremental threshold signal to the base pattern signal. The pattern generator 130 preferably generates all pattern signals possible for the combination of the incremental threshold signal and the base pattern signal. The optimizer 128 receives the possible pattern signals from the pattern generator 130 in step 514 and selects the possible pattern signal, which is closest to optimal, as the pattern signal for the dither matrix for the currently selected gray level. Every pattern introduces error to the output image. The optimizer 128 uses these spatial techniques, frequency techniques, or both to determine the error that each possible pattern signal would introduce to the output image. The optimizer 128 then selects the pattern signal that would introduce the least error.

The present invention advantageously allows for variation in the patterns of the set of dither matrices, yet at the same time limits that variation. This yields patterns that are close to optimal, and thus better results than fully stacked dither. This also yields patterns that do not introduce visual artifacts, and thus better results than 3DGLOOD.

In step 516, the selected possible pattern signal is stored in the dither matrix storage 122 as the dither matrix signal for the currently selected gray level. The method then determines if there is another gray level above the current gray level in step 518. If there is another gray level, the method selects the pattern signal just stored in the dither matrix storage 122 as the base pattern signal in step 520. The incremental threshold generator 118 also increments the gray level counter to the next gray level and returns to step 510 to generate a dither matrix signal for this gray level.

If in step 518 there were no additional gray levels, the method proceeds to step 522. In step 522, the pixel activator 124 compares the input image, received in step 500, to the dither matrix signals stored in the dither matrix storage 122. The input image is divided into elements. Each element corresponds to a pixel on the display device 110 or the hard output device 112 on which the input image will be output. The dither matrix signals are repeated across the input image so that each element has a corresponding cell in the dither matrices.

Each element of the input image has an intensity. The pixel activator 124 first determines the gray level that is closest to the intensity of each element. Then, for each element, the pixel activator 124 selects the dither matrix signal for the gray level of the element. The pixel activator 124 then selects the cell of the selected dither matrix signal that corresponds to the element. Since the dither matrix signal is repeated across the input image, the corresponding cell may be found by applying a modulo function to the coordinates of the element. The base of the modulo function is the size of the dither matrices. Once the pixel activator has found the cell that corresponds to the element, the pixel activator determines if the cell is turned on. If the cell is turned on, then the pixel activator 124 will turn on the corresponding pixel of the output image. If the cell is turned off, then the pixel activator 124 will turn off the corresponding pixel. Once the pixel activator 124 has compared all the elements of the input image, the method moves to step 524 where the pixel activator 124 generates a signal to the display device 110 or the hard output device 112, whichever is to output the image, to turn on and to turn off the appropriate pixels. The method then ends.

Those skilled in the art will realize that the set of dither matrix signals may be generated without receiving a continuous toned image signal and outputting an image. Furthermore, those skilled in the art will realize that the system 104 can receive a continuous toned image signal and generate an output image using a set of pre-existing dither matrix signals. It is not necessary to generate a set of dither matrix signals for each image. The system 104 can generate a set of dither matrix signals once and use the set for more than one image.

Figure 6A:
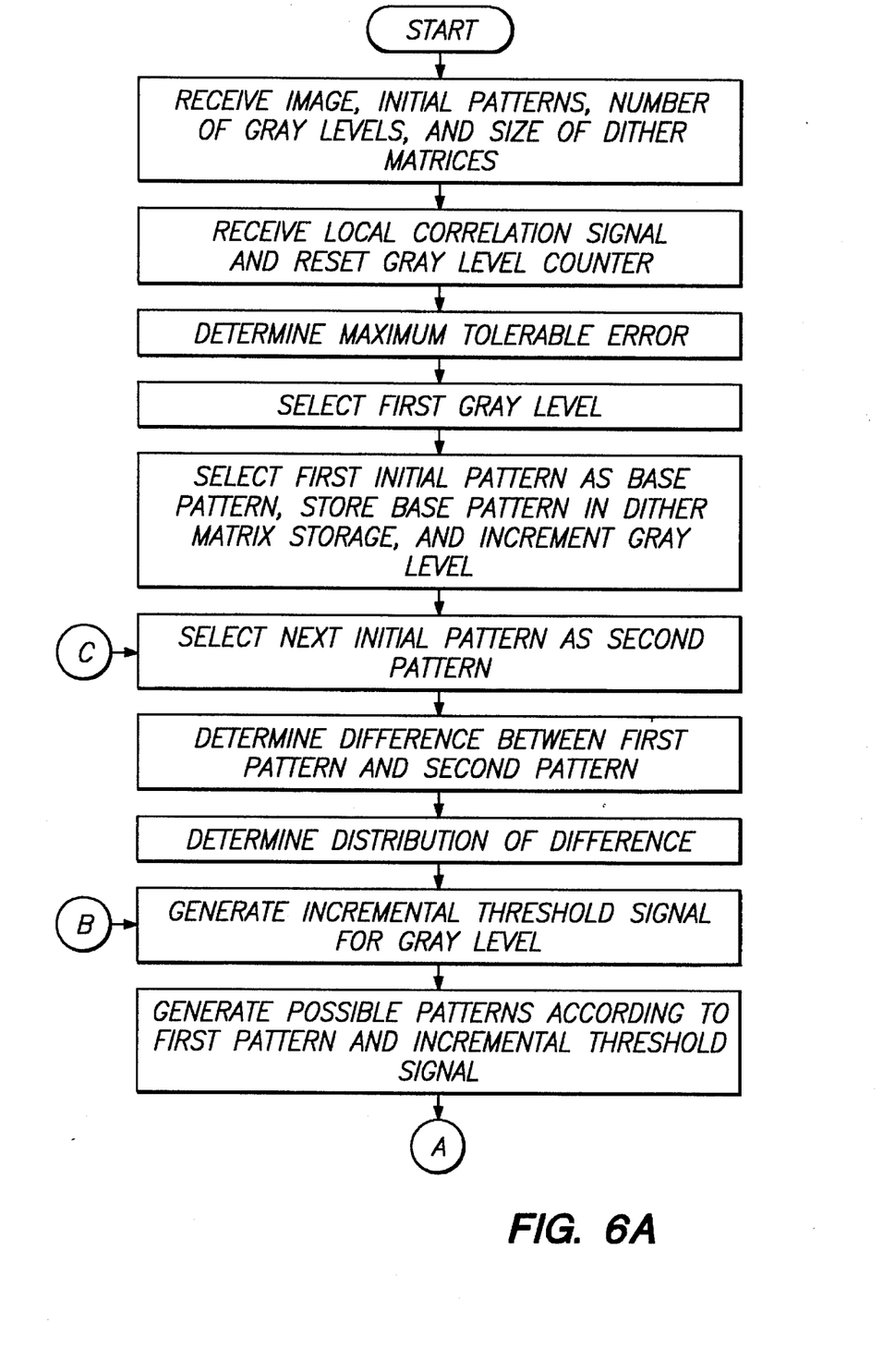
FIGS. 6A and 6B are flow charts showing a method for generating a set of dither matrices from a set of initial dither matrices.
Figure 6B:
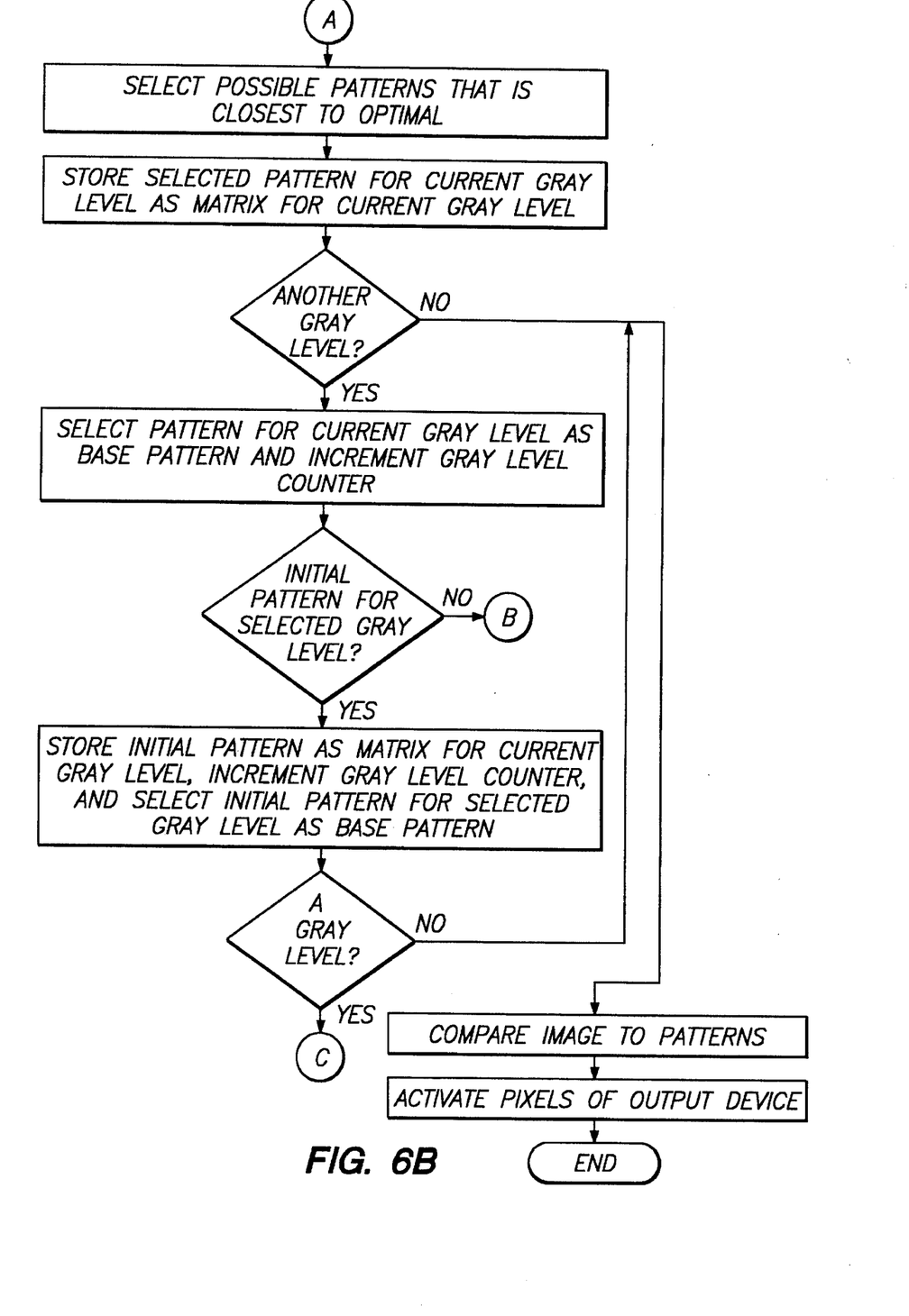

Referring now to FIGS. 6A and 6B, flow charts of a method for generating a set of dither matrix signals having local correlation when there are intermediate pattern signals stored within the initial patterns storage 120 are shown. In the method shown in FIGS. 5A and 5B, the initial patterns were only at the beginning and end of the gray scale. In the method shown in FIGS. 6A and 6B there are initial pattern signals, intermediate patterns, within the gray scale.

The method begins in step 600 where the system 104 receives the image to be output, the initial pattern signal, the number of gray levels, and the size of the dither matrices. The initial pattern signals include intermediate pattern signals. Intermediate pattern signals indicate pre-selected patterns for certain gray levels. The intermediate patterns are not the boundary patterns. In step 602, the system 104 receives the local correlation criteria signal, and the incremental threshold generator 118 resets it gray level counter. In step 604, the incremental threshold generator 118 determines the maximum tolerable error as in steps 502 and 504 of FIG. 5A. In step 606, the first gray level is selected, and in step 608, the first initial pattern signal, a boundary pattern signal, is selected as the base pattern signal. The first initial pattern signal is stored in the dither matrix storage 122 as the dither matrix signal for the first gray level, and the next gray level is selected. In step 610, the incremental threshold generator 118 selects the next initial pattern signal and designates it as the second pattern signal. At step 610, there is always another initial pattern signal. If there are no initial pattern signal within the gray levels, the final pattern signal is the next initial pattern signal. If there is no initial, final pattern signal, then all on is the final pattern by default and is the next initial pattern signal. The next initial pattern signal is the next initial pattern signal in order moving up the gray scale. The incremental threshold generator 118, in step 612, determines the difference between the base pattern signal and the second pattern signal by determining the cells that have changed between the base pattern and the second pattern signal. The incremental threshold generator 118 determines the number of gray levels between the base pattern signal and the second pattern signal in step 614 and divides the difference, determined in step 612, between the gray levels. As was explained above, each initial pattern signal has an indicator of its corresponding gray level. Determining the number of gray levels between two initial pattern signals is a simple matter of subtracting the corresponding gray levels. For example, if the incremental threshold generator 118 determines in step 612 that the second pattern signal has 4 cells turned on, which the base pattern signal has in the off state, and the second pattern signals has 2 cells turned off, which the base pattern signal has in the on state, and if there are 2 gray levels between the base pattern signal and the second pattern signal, then the incremental threshold generator 118 will determine that at each gray level, 2 cells, which make up the difference in on cells, must be turned on and 1 of the cells, which make up the difference in off cells, must be turned off. Once these cells transition, they may not transition again until the gray level for the second pattern signal is reached. In this way, the system 104 forces the pattern signal to move towards the second pattern signal.

In step 616, the incremental threshold generator 118 generates the incremental threshold signal. The incremental threshold generator 118 generates the incremental threshold signal as described with reference to step 510 of FIG. 5A with the additional requirement of the difference between the base pattern signal and the second pattern signal. The pattern generator 130 receives the incremental threshold signal and the base pattern signal in step 618 and generates the possible patterns from the base pattern signal according to the incremental threshold signal with the restriction of the difference between the base pattern signal and the second pattern signal. The pattern generator 130 also receives the second pattern signal. When generating possible pattern signals, the pattern generator 130 does not change cells that are already in the on state that are in the second pattern. In this way the pattern generator 130 incorporates the restriction of the differences between the base pattern signal and the second pattern signal. Those skilled in the art will realize that there are other methods for restricting the pattern signals according to the difference between the base pattern signal and the second pattern signal. The cells may vary and transition repeatedly before reaching the second pattern signal so long as the second pattern signal is reached. The optimizer 128 then receives the possible pattern signals from the pattern generator 130 and selects the possible pattern signal that is closest to optimal. The method by which the optimizer 128 selects a possible pattern signal is described in step 514 of FIG. 5A. In step 622, the optimizer 128 stores the selected possible pattern signal in the dither matrix signal storage 122 as the dither matrix signal for the current gray level.

In step 624, the incremental threshold generator 118 determines if there is another higher gray level. If there is another gray level, the method continues in step 626 where the incremental threshold generator 118 selects the pattern signal for the current gray level as the base pattern signal and the incremental threshold generator 118 increments the gray level counter. In step 628, the incremental threshold generator 118 determines if there is an initial pattern signal for the current gray level. If there is not, the method returns to step 616 to generate a dither matrix signal for the current gray level. If there is an initial pattern signal for the currently selected gray level, the incremental threshold generator 118 stores the initial pattern signal for the gray level in the dither matrix storage 122 as the dither matrix signal for the gray level, and the incremental threshold generator 118 increments the gray level counter. Finally, the incremental threshold generator 118 selects the initial pattern signal as the base pattern signal. In step 632, the incremental threshold generator 118 determines if the current gray level exists. If it does, the method returns to step 610 to determine the difference to the next initial pattern signal. If in step 624 there is not another gray level or if in step 632 the current gray level does not exist, the method continues in steps 634 and 636. In steps 634 and 636, the pixel activator 124 outputs the image as was described with reference to steps 522 and 525 in FIG. 5B. The method then ends.

While the present invention has been described with reference to certain preferred embodiments, those skilled in the art will recognize that various modifications may be provided. It is not required that the dither matrices be generated starting from an all off dither matrix or starting the dither matrix for the least gray level. The dither matrices may be generated starting at any gray level. These and other variations upon and modifications to the preferred embodiments are provided for by the present invention, which is limited only by the following claims.

What is claimed is:

1. A system for generating a set of dither matrices, the system comprising:

an incremental threshold generator, having an input coupled to receive a local correlation criteria signal and having an output, for generating an incremental threshold signal that controls the activation of cells in a dither matrix; and a pattern generator, having an input coupled to receive the incremental threshold signal from the incremental threshold generator and having an output, for generating a first dither matrix signal for a gray level in response to the incremental threshold signal and a second dither matrix signal for a current gray level.

2. The system of claim 1, wherein the pattern generator generates signals to activate at least two cells of the first dither matrix signal and to deactivate at least one cell of the first dither matrix signal to generate the second dither matrix signal.

3. The system of claim 1, wherein the pattern generator generates more than one dither matrix signal in response to the incremental threshold signal and the second dither matrix signal.

4. The system of claim 3, further comprising an optimizer, having an input coupled to receive a plurality of dither matrix signals from the pattern generator and having an output, for determining the dither matrix signal, received from the pattern generator, that introduces the least error to an output image.

5. The system of claim 4 further comprising: an initial patterns storage, having an input coupled to receive a plurality of initial pattern signals and an output coupled to the pattern generator for storing the initial pattern signals.

6. The system of claim 5 further comprising a dither matrix storage, having an input coupled to receive dither matrix signals from the optimizer, for storing dither matrix signals.

7. A system for generating a binary representation signal in response to a continuous toned image signal, the system comprising:

an incremental threshold generator, having an input coupled to receive a local correlation criteria signal and having an output, for generating an incremental threshold signal that controls the activation of cells in a dither matrix;

a pattern generator, having an input coupled to receive the incremental threshold signal from the incremental threshold generator and having an output, for generating a first dither matrix signal for a gray level in response to the incremental threshold signal and a second dither matrix signal for a current gray level;

a dither matrix storage, having an input coupled to receive dither matrix signals from the optimizer, for storing dither matrix signals; and a pixel activator, having a first input coupled to receive the continuous toned image signal, a second input coupled to receive dither matrix signals from the dither matrix storage, and an output, for comparing the continuous toned image signal to the dither matrix signal and for generating a signal indicating pixels to activate on the output device.

8. A method for generating a second dither matrix signal having local correlation with a first dither matrix signal, the method comprising the steps of:

receiving the first dither matrix signal;

receiving a local correlation criteria signal;

determining a maximum tolerable error signal from the local correlation criteria signal and the first dither matrix signal;

generating an incremental threshold signal from the maximum tolerable error; and modifying the first dither matrix signal using the incremental threshold signal to produce the second dither matrix signal.

9. The method of claim 8, wherein the step of modifying comprises the steps of:

turning at least two cells of the first dither matrix signal on; and turning at least one cell of the first dither matrix signal off.

10. The method of claim 9, wherein the step of modifying includes modifying the first dither matrix signal according to the incremental threshold signal to produce at least one possible second dither matrix signal.

11. The method of claim 10, wherein the step of modifying further includes the steps of:

determining a possible second dither matrix signal that introduces the least error to an image; and selecting the determined possible second dither matrix signal that introduces the least error to an image as the second dither matrix signal.

12. The method of claim 11, wherein the determining step uses spatial techniques to determine the possible second matrix signal that introduces the least error to an output image.

13. The method of claim 11, wherein the determining step uses frequency techniques to determine the possible second matrix signal that introduces the least error to an output image.

14. The method of claim 11, wherein the determining step uses spatial techniques and frequency techniques to determine the possible second matrix signal that introduces the least error to an output image.

15. A method for generating a set of dither matrix signals, the method comprising the steps of:

receiving a local correlation criteria signal;

determining a maximum tolerable error signal for a halftone image;

generating an incremental threshold signal from the maximum tolerable error signal;

selecting a first dither matrix for a first gray level as a base dither matrix signal;

selecting a second gray level;

generating a second dither matrix signal for the second gray level according to the base dither matrix signal and the incremental threshold signal;

determining if there is another gray level;

designating the second dither matrix signal as the base dither matrix signal if there is another gray level;

designating the second gray level as the first gray level if there is another gray level; and repeating the steps of generating an incremental threshold signal, selecting a second gray level, generating a second dither matrix signal, determining if there is another gray level, designating the received dither matrix signal, designating the second gray level, and repeating if there is another gray level.

16. A system for generating a dither matrix signal having local correlation with a first dither matrix signal, the system comprising:

means for receiving the first dither matrix signal;

means for receiving a local correlation criteria signal;

means for determining a maximum tolerable error signal from the local correlation criteria signal and the first dither matrix signal;

means for generating an incremental threshold signal using from the maximum tolerable error; and means for modifying the first dither matrix signal using the incremental threshold signal to produce the second dither matrix signal.

17. The system of claim 16, wherein the modifying means comprises:

means for turning at least two cells of the first dither matrix signal on; and means for turning at least one cell of the first dither matrix signal off.

18. The system of claim 17, wherein modifying means includes means for modifying the first dither matrix signal according to the incremental threshold signal to produce at least one possible second dither matrix signal.

19. The system of claim 18, wherein the modifying means further includes:

means for determining a possible second dither matrix signal that introduces the least error to an image; and means for selecting the determined possible second dither matrix signal that introduces the least error to an image as the second dither matrix signal.

20. The system of claim 19, wherein the determining means uses spatial techniques to determine the possible second matrix signal that introduces the least error to an output image.

21. The system of claim 19, wherein the determining means uses frequency techniques to determine the possible second matrix signal that introduces the least error to an output image.

22. The system claim 19, wherein the determining means uses spatial techniques and frequency techniques to determine the possible second matrix signal that introduces the least error to an output image.

23. A system for generating a set of dither matrix signals, the system comprising:

means for receiving a local correlation criteria signal;

means for determining a maximum tolerable error signal for a halftone image signal;

means for generating an incremental threshold signal from the maximum tolerable error signal;

means for selecting a first dither matrix for a first gray level as a base dither matrix signal;

means for selecting a second gray level;

means for generating a second dither matrix signal for the second gray level according to the base dither matrix signal and the incremental threshold signal;

means for determining if there is another gray level;

means for designating the second dither matrix signal as the base dither matrix signal if there is another gray level; and means for designating the second gray level as the first gray level if there is another gray level.

24. The system of claim 1, wherein the pattern generator generates signals to activate at least one cell of the first dither matrix signal to generate the second dither matrix signal.

* * * * *